United States Patent
Arayama

(10) Patent No.: US 9,934,527 B2
(45) Date of Patent: Apr. 3, 2018

(54) SHOE SELECTION SUPPORT SYSTEM

(71) Applicant: DREAM GP INC., Osaka-shi, Osaka (JP)

(72) Inventor: Motohide Arayama, Osaka (JP)

(73) Assignee: DREAM GP INC., Osaka-Shi, Osaka (JP)

( * ) Notice: Subject to any disclaimer, the term of this patent is extended or adjusted under 35 U.S.C. 154(b) by 584 days.

(21) Appl. No.: 14/378,251

(22) PCT Filed: Nov. 28, 2013

(86) PCT No.: PCT/JP2013/082095
§ 371 (c)(1),
(2) Date: Aug. 12, 2014

(87) PCT Pub. No.: WO2014/091940
PCT Pub. Date: Jun. 19, 2014

(65) Prior Publication Data
US 2015/0058169 A1 Feb. 26, 2015

(30) Foreign Application Priority Data
Dec. 10, 2012 (JP) .................. 2012-269833

(51) Int. Cl.
G06Q 30/00 (2012.01)
G06Q 30/06 (2012.01)
A43D 1/02 (2006.01)

(52) U.S. Cl.
CPC .......... *G06Q 30/0623* (2013.01); *A43D 1/02* (2013.01); *A43D 2200/60* (2013.01)

(58) Field of Classification Search
CPC ........................................ G06Q 30/06–30/08
(Continued)

(56) References Cited

U.S. PATENT DOCUMENTS

| 5,659,395 A * | 8/1997 | Brown | A43D 1/025 33/3 R |
| 2014/0129390 A1* | 5/2014 | Mauge | G06Q 30/0631 705/26.63 |

FOREIGN PATENT DOCUMENTS

| JP | 2005-169015 A | 6/2005 |
| JP | 2010-084263 A | 4/2010 |
(Continued)

OTHER PUBLICATIONS

"Demandware Powers New eCommerce Site for Mirapodo, the Online Shoe Shop of the Otto Group" (PR Newswire, Apr. 14, 2010) (Year: 2010).*

(Continued)

*Primary Examiner* — Ethan D Civan
(74) *Attorney, Agent, or Firm* — Manabu Kanesaka

(57) ABSTRACT

Provided is a shoe selection support system in which it is possible to utilize information from other people while considering individual differences and in which it is possible to easily select suitable shoes.

This system is provided with: (a), a shoe information storage unit (27) which associates and stores shoe IDs and shoe information; (b), a member information storage unit (28) which associates and stores member IDs and member information that includes foot size; (c), a related information storage unit (29) which associates and stores related information, shoe IDs and member IDs; (d), a shoe size distribution generation unit (22) which generates shoe size distribution data for showing a shoe size distribution diagram; (e), a foot size distribution generation unit (23) which generates foot size distribution data for displaying a foot size distribution diagram; and (f), a member specification unit (25) which generates specific member data for showing the (Continued)

position corresponding to the foot size of the specified member in a shoe size distribution diagram and a foot size distribution diagram.

9 Claims, 4 Drawing Sheets

(58) Field of Classification Search
USPC .............................................. 705/26.1–27.2
See application file for complete search history.

(56) References Cited

FOREIGN PATENT DOCUMENTS

| WO | 91/17676 A1 | 11/1991 | |
|---|---|---|---|
| WO | WO 9117676 A1 * | 11/1991 | ........... A43D 119/00 |
| WO | 2005/006905 A1 | 1/2005 | |

OTHER PUBLICATIONS

PCT, "International Search Report for International Application No. PCT/JP2013/082095".

* cited by examiner

SHOE SELECTION SUPPORT SYSTEM

RELATED APPLICATIONS

The present application is National Phase of International Application No. PCT/JP2013/082095 filed Nov. 28, 2013, and claims priority from Japanese Application No. 2012-269833, filed Dec. 10, 2012.

TECHNICAL FIELD

The present invention relates to a shoe selection support system, specifically, to a shoe selection support system that provides information for selecting suitable shoes.

BACKGROUND ART

Conventionally, various systems for selecting shoes that fit a foot size are proposed (for example, refer to Patent Literature 1).

CITATION LIST

Patent Literature

Patent Literature 1: Japanese Patent Publication No. 3025530
Patent Literature 2: International Patent Publication No. WO2005/006905

SUMMARY OF THE INVENTION

Problems to be Solved by the Invention

However, generally, shoe sizes are indicated by predetermined values at regular intervals, and even if the size indications are the same, the size differs among manufacturers or models. In addition, the fitting comfort including the feeling of tightness of shoes differs among individuals. Therefore, suitable shoes cannot be selected based on only size fit between shoes and feet.

If a customer tries shoes on for selecting suitable shoes, both the customer and a store clerk spend their time on this. Therefore, it is preferable that targets to be tried on are narrowed down to reduce the number of times of trial fitting.

With shopping for shoes by mail order, trial fitting is impossible. In the case where purchased shoes do not fit a customer's feet, if return or exchange of the shoes is allowed, the return or exchange leads to an increase in cost.

In recent years, people select and purchase items by referring to other people's comments and feedback posted on websites. However, selection of shoes is greatly influenced by individual differences in size of feet and preference for the fitting comfort, etc., so that the range in which information from other people can he utilized is limited.

In consideration of these circumstances, the present invention is to provide a shoe selection support system with which information from other people can be utilized while considering individual differences and suitable shoes can easily be selected.

Means for Solving the Problems

In order to solve the above-described problems, the present invention provides a shoe selection support system constituted as described below.

The shoe selection support system includes (a) a shoe information storage unit that stores shoe IDs for specifying shoes and shoe information including shoe sizes of the shoes in association with each other, (b) a member information storage unit that stores member IDs for specifying members and member information including foot sizes of the members in association with each other, (c) a related information storage unit that stores related information on the relationship between the shoes and the members, the shoe IDs of the shoes, and the member IDs of the members in association with each other, (d) a shoe size distribution generation unit that reads the shoe IDs and the shoe sizes of the shoes from the shoe information storage unit and generates shoe size distribution data for displaying a shoe size distribution diagram showing the shoe sizes and the shoe IDs of the shoes in association with each other, (e) a foot size distribution generation unit that reads the member IDs and the related information stored in association with the shoe ID of the shoes selected from the shoe size distribution diagram from the related information storage unit, reads the foot sizes stored in association with the read member IDs from the member information storage unit, and generates foot size distribution data for displaying a foot size distribution diagram showing the read foot sizes of the members having the read member IDs and the read foot sizes together with the read related information, and (f) a member specification unit that specifies the member ID, reads the foot size associated with the specified member ID from the member information storage unit, and generates specific member data for displaying a position corresponding to the read foot size in the shoe size distribution diagram and the foot size distribution diagram.

With the above-described constitution, in the shoe size distribution diagram, a position corresponding to a foot size of a member (specified member) whose member ID was specified by the member specification unit is displayed, so that the difference between the foot size and the shoe size that has a great influence on shoe fitting can be intuitively understood. Therefore, shoes that are likely to fit the specified member can easily be selected.

When shoes are selected from the shoe size distribution diagram, foot sizes of members whose related information are associated with the selected shoes are displayed together with the related information in the foot size distribution diagram. In the foot size distribution diagram, a position corresponding to the foot size of the specified member is also displayed, so that by referring to the related information displayed in the foot size distribution diagram while considering the differences in foot size from the specified member, the fit of the shoes selected from the shoe size distribution diagram to the specified member can be examined.

Therefore, information of other members can be utilized while considering individual differences, and suitable shoes can easily be selected.

Preferably, the shoe selection support system further includes (f) a reference information generation unit that generates reference information data for displaying the related information stored in the related information storage unit in association with the shoe ID of the shoes selected from the shoe size distribution diagram and the member ID of the member selected from the foot size distribution diagram.

In this case, when a member is selected from the foot size distribution diagram, related information (for example, comments on shoes) on the relationship between the shoes selected from the shoe size distribution diagram and the member selected from the foot size distribution diagram is displayed. In the foot size distribution diagram, a position corresponding to the foot size of the specified member is also displayed, so that by examining the related information associated with other members whose foot sizes are displayed in the foot size distribution diagram while considering the differences in foot size from the specified member, the fit of the shoes selected from the shoe size distribution diagram to the specified member can be examined.

Preferably, the shoe selection support system further includes a membership acceptance unit that generates the member ID and the member information which are stored in the member information storage unit in association with each other. The membership acceptance unit calculates the foot size based on photographic data of feet.

In this case, the foot size can be calculated with a certain degree of accuracy from a photograph of feet, this provides incentive for carrying out a new member registration in the shoe selection support system.

Further, in order to solve the above-described problems, the present invention provides a shoe selection support system constituted as described below.

The shoe selection support system includes (a) a shoe information storage unit that stores shoe IDs for specifying shoes and shoe information including shoe sizes of the shoes in association with each other, (b) a member information storage unit that stores member IDs for specifying members and member information including foot sizes of the members in association with each other, (c) a related information storage unit that stores related information on the relationship between the shoes and the members, the shoe IDs of the shoes, and the member IDs of the members in association with each other, (d) a foot size distribution generation unit that reads the member IDs and the foot sizes of the members from the member information storage unit, and generates foot size distribution data for displaying a foot size distribution diagram showing the read foot sizes of the members in association with the member IDs, (e) a reference information generation unit that reads the shoe IDs and the related information stored in association with the member ID of the member selected from the foot size distribution diagram from the related information storage unit, reads the shoe information stored in association with the read shoe IDs from the shoe information storage unit, and generates reference information data for displaying the read related information and the read shoe information, and (f) a member specification unit that specifies the member ID, reads the foot size associated with the read member ID from the member information storage unit, and generates specific member data for displaying a position corresponding to the read foot size in the foot size distribution diagram.

With the above-described constitution, in the foot size distribution diagram, a position corresponding to a foot size of a member (specified member) whose member ID was specified by the member specification unit is displayed, and the differences in foot size between the specified member and other members can be intuitively understood. Therefore, from the foot size distribution diagram, members whose differences in foot size from the specified member are small can easily be narrowed down and referred to.

When a member is selected from the foot size distribution diagram, based on reference information data generated by the reference information generation unit, member information of the selected member and shoe information and related information associated with the selected member are displayed. Therefore, while considering the differences in member information between the specified member and the selected member and referring to related information on shoes associated with the selected member, the fit of the shoes associated with the selected member to the specified member can be examined.

Therefore, information of other members can be utilized while considering individual differences, and suitable shoes can easily be selected.

Preferably, the shoe selection support system further includes a membership acceptance unit that generates the member ID and the member information which are stored in association. with each other in the member information storage unit. The membership acceptance unit calculates the foot size based on photographic data of feet.

In this case, the foot size can be calculated with a certain degree of accuracy from the photograph of feet, this provides incentive for carrying out a new member registration in the shoe selection support system.

In addition, in order to solve the above-described problems, the present invention provides a shoe selection support system constituted as described below.

The shoe selection support system includes (a) a shoe information storage unit that stores shoe IDs for specifying shoes and shoe information including shoe sizes of the shoes in association with each other, (b) a member information storage unit that stores member IDs for specifying members and member information including foot sizes of the members in association with each other, (c) a related information storage unit that stores related information on the relationship between the shoes and the members, the shoe IDs of the shoes, and the member Ills of the members in association with each other, (d) a shoe size distribution generation unit that reads the shoe IDs and the shoe sizes of the shoes from the shoe information storage unit and generates shoe size distribution data for displaying a shoe size distribution diagram showing the shoe sizes and the shoe IDs of the shoes in association with each other, (e) a reference information generation unit that reads the member IDs and the related information stored in association with the shoe ID of the shoes selected from the shoe size distribution diagram from the related information storage unit, reads the member information stored in association with the read member IDs from the member information storage unit, and generates reference information data for displaying the read related information and the read member information, and (f) a member specification unit that specifies the member ID, reads the foot size associated with the specified member ID from the member information storage unit, and generates specific member data for displaying a position corresponding to the read foot size in the shoe size distribution diagram.

With the above-described constitution, in the shoe size distribution diagram, a position corresponding to the foot size of the member (specified member) whose member ID was specified by the member specification unit is displayed. From the shoe size distribution diagram, the difference between the foot size and the shoe size that has a great influence on shoe fitting can be intuitively understood, so that shoes being likely to fit the specified member can easily be selected.

When shoes are selected from the shoe size distribution diagram, related information on the selected shoes and member information of members whose member IDs are associated with the related information are displayed. Therefore, while considering the differences in member information (for example, gender and exercise history) between the specified member and members associated with the related information, by referring to the related information (for example, fitting comfort, etc.) on the shoes selected from the shoe size distribution diagram, the fit of the shoes selected from the shoe size distribution diagram to the specified member can be examined.

Therefore, information of other members can be utilized while considering individual differences, and suitable shoes can easily be selected.

Preferably, the shoe selection support system further includes a membership acceptance unit that generates the member ID and the member information which are stored in association with each other in the member information storage unit. The membership acceptance unit calculates the foot size based on photographic data of feet.

In this case, from a photograph of feet, the foot size can be calculated with a certain degree of accuracy, and this provides incentive for carrying out a new member registration in the shoe selection support system.

Effects of the Invention

According to the present invention, information from other people can be utilized while considering individual differences, and suitable shoes can easily be selected. As a result, targets to be tried on can be narrowed down, and the number of times of trial fitting can be reduced. In addition, the possibility of selecting suitable shoes is increased, so that with shopping for shoes by mail order, returns and exchanges can be reduced.

BEST MODE FOR CARRYING OUT THE INVENTION

Hereinafter, preferred embodiments of the present invention are described with reference to FIG. 1 to FIG. 7.

Example 1

A shoe selection support system 10 according to Example 1 is described with reference to FIG. 1 to FIG. 3.

Figure 1:
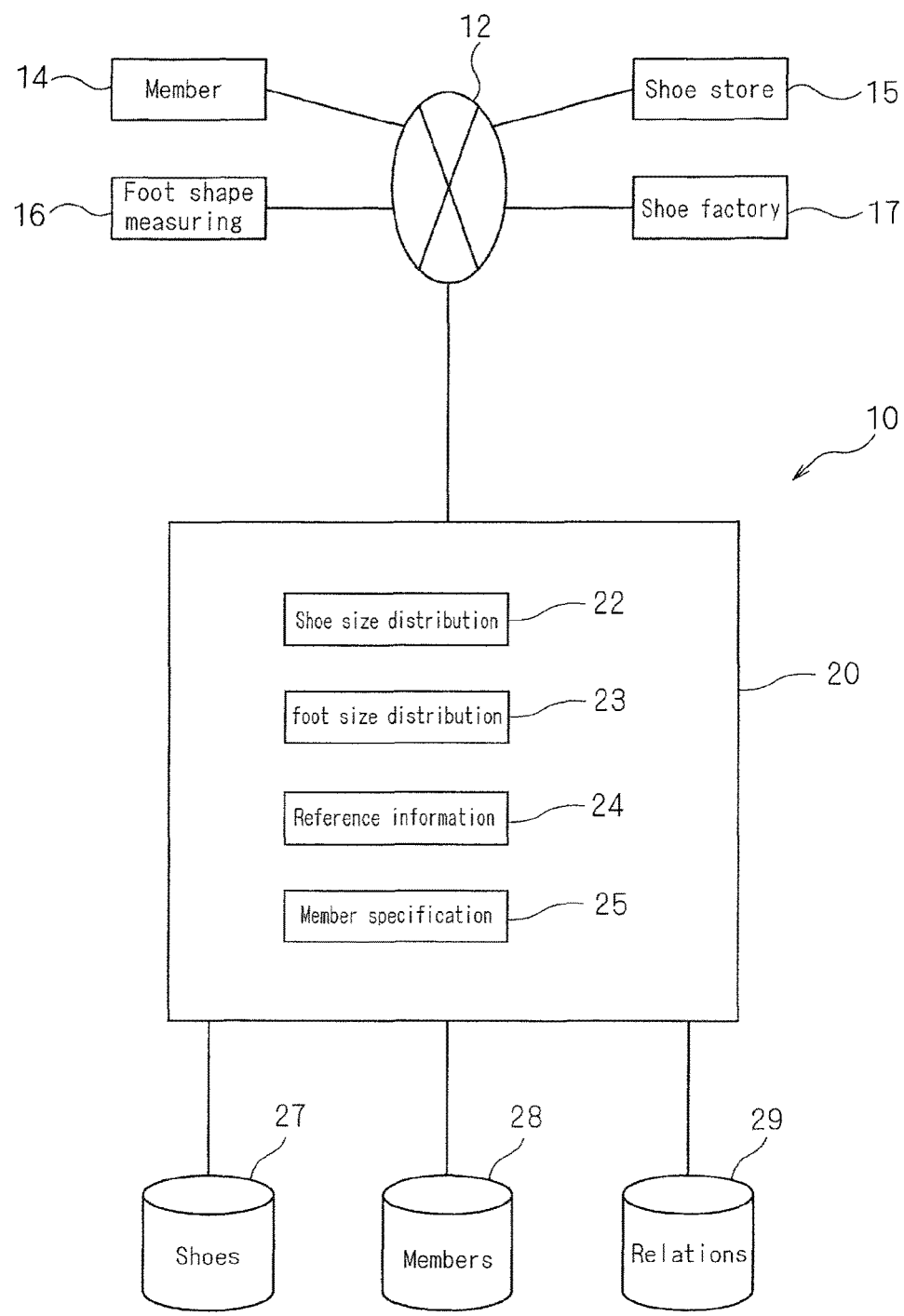
FIG. 1 is a block diagram of a shoe selection support system. (Example 1)

FIG. 1 is a block diagram showing the shoe selection support system 10. As shown in FIG. 1, the shoe selection support system 10 is connected to terminals 14 to 17 of members, shoe stores, foot shape measuring devices, and shoe factories via a communication network 12 such as the Internet and LAN, etc., and these can communicate with each other.

The shoe selection support system 10 includes a shoe information storage unit 27, a member information storage unit 28, and a related information storage unit 29 that are connected to a system server 20.

Each of the storage units 27 to 29 includes a hard disk, etc., for storing various information.

The shoe information storage unit 27 is a database storing shoe IDs for identifying shoes and shoe information (for example, types of the shoes, photographs of the shoes, and descriptions of the shoes, etc.) including shoe sizes of the shoes in association with each other. The member information storage unit 28 is a database storing member IDs for specifying members and member information (for example, gender, exercise history, etc.) including foot sizes of the members in association with each other. The related information storage unit 29 is a database storing related information on the relationship between shoes and members (shoe purchase history, shoe fitting comfort codes, and comments on shoes, etc.), the shoe IDs of the shoes, and the member IDs of the members in association with each other. For example, the system server 20 updates data stored in the shoe information storage unit 27 based on data transmitted from the terminal 17 of a shoe factory, updates data stored in the member information storage unit 28 based on data transmitted from the terminal 14 of a member or the terminal 15 of a shoe store, and updates data stored in the related information storage unit 29 based on data transmitted from the terminal 15 of a shoe store.

A part or the whole of the respective storage units to 29 may be integrated. For example, the member information storage unit 28 and the related information storage unit 29 may be integrated as one database.

The system server 20 includes an interface for communications with the terminals 14 to 17, a CPU, and a storage device, etc., executes predetermined programs to perform various processing such as accepting inputs from the terminals 14 to 17 and generating and outputting data for displaying images on the terminals 14 to 17. The system server 20 includes a shoe size distribution generation unit 22, a foot size distribution generation unit 23, a reference information generation unit 24, and a member specification unit 25.

The shoe size distribution generation unit 22 reads shoe IDs and shoe sizes of shoes from the shoe information storage unit 27, and generates shoe size distribution data for displaying a shoe size distribution diagram of the shoes whose shoe IDs and shoe sizes were read showing the shoe sizes in association with the shoe IDs. The shoe size distribution generation unit 22 may be constituted so that it can narrow down shoes based on the shoe information and generate shoe size distribution data for displaying a shoe size distribution diagram of the shoes narrowed down by the conditions such as the shoe size range and the shoe type.

The foot size distribution generation unit 23 reads member IDs and related information stored in association with the shoe ID of the shoes selected from the shoe size distribution diagram from the related information storage unit 29, and reads the foot sizes stored in association with the read member IDs from the member information storage unit 28. Then, the foot size distribution generation unit 23 generates foot size distribution data for displaying a foot size distribution diagram showing foot sizes of the members whose member IDs and foot sizes were read together with member information.

The reference information generation unit 24 generates reference information data for displaying related information stored in the related information storage unit 29 in association with the shoe ID of the shoes selected from the shoe size distribution diagram and the member ID of the member selected from the foot size distribution diagram.

The member specification unit 25 specifies a member ID. The member specification unit 25 reads a foot size associated with the specified member ID from the member information storage unit 28, and generates specific member data for displaying a position corresponding to the read foot size in the shoe size distribution diagram and the foot size distribution diagram.

Next, a flow of processing of the shoe selection support system 10 is described.

(1) Member Specification

First, the member specification unit 25 specifies a member ID and generates specific member data. For example, the member specification unit 25 accepts a log-in operation from a member's terminal 14 such as a personal computer, a cell phone, a smartphone, or the like and specifies a member ID of the member who has made a connection to the shoe selection support system 10. The member specification unit 25 may specify a member ID when accepting an input relating to a member who is a customer.

(2) Display of Shoe Size Distribution Diagram

Next, a mode selection screen is displayed on the terminal. When the terminal is operated and the "shoes see mode" is selected, based on the shoe size distribution data generated by the shoe size distribution generation unit 22, a shoe size distribution diagram is displayed on the terminal. At this time, based on the specific member data generated by the member specification unit 25, a position corresponding to the foot size of the specified member is displayed in the shoe size distribution diagram displayed on the terminal.

Figure 2:
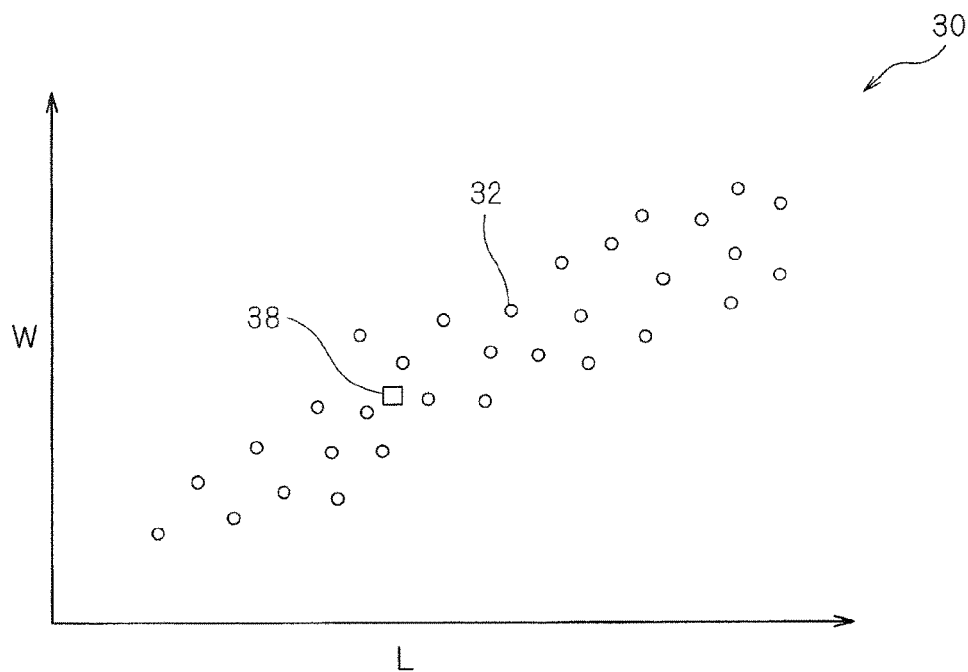
FIG. 2 is an explanatory view of a shoe size distribution diagram. (Example 1)

FIG. 2 schematically shows a shoe size distribution diagram 30 to be displayed on the terminal. As shown in FIG. 2, in the shoe size distribution diagram 30, the horizontal axis shows the foot length L and the vertical axis shows the foot circumference or foot width W, and at the positions corresponding to shoe sizes, marks 32 are displayed, and at the position corresponding to the foot size of the specified member, a mark 38 is displayed. The shoe size distribution diagram may be three-dimensionally displayed to show, for example, the foot length, the foot circumference, and the foot width.

As a shoe size, when a size indication of shoes is stored in the shoe information storage unit 27, in the shoe size distribution diagram 30, the foot length of the size indication is displayed as it is, and as the foot circumference or foot width, a size corresponding to the symbol (A to E, EE, and EEE, etc.) (for example, a size according to the appendix tables 1 to 3 of JIS S 5037:1998) is displayed. It is also possible that, as a shoe size, such a size including a size obtained by actually measuring the shoes or a size determined individually through trial fitting, etc., is stored in the shoe information storage unit 27 and displayed in the shoe size distribution diagram.

(3) Selection of Shoes

Next, shoes are selected from the shoe size distribution diagram 30. In the shoe size distribution diagram 30, a position corresponding to the foot size of the specified member is indicated by the mark 38, so that the difference between the foot size and the shoe size that has a great influence on shoe fitting can be intuitively understood from the shoe size distribution diagram 30. For example, based on how the marks 32 and 38 are separated from each other, a fit state of the shoes to the feet of the specified member can easily be predicted, and as the shoe size is smaller than the foot size of the specified member, tightness of the shoes increases, and as the shoe size is larger than the foot size of the specified member, the tightness of the shoes decreases, or room is formed and eliminates the tightness. Therefore, from the shoe size distribution diagram 30, shoes that are likely to fit the specified member can easily be selected.

(4) Display of Shoe Size Distribution Diagram

When a terminal is operated and shoes are selected from the shoe size distribution diagram, based on foot size distribution data generated by the foot size distribution generation unit 23, a foot size distribution diagram is displayed on the terminal. At this time, based on specific member data generated by the member specification unit 25, a position corresponding to the foot size of the specified member is displayed in the foot size distribution diagram displayed on the terminal.

In the shoe size distribution diagram, shoe sizes are displayed in association with shoe IDs, so that when a mark showing a shoe size is selected from the shoe size distribution diagram, a shoe ID associated with the mark can be specified, and member IDs and related information stored in association with the specified shoe ID can be read from the related information storage unit 29.

Figure 3:
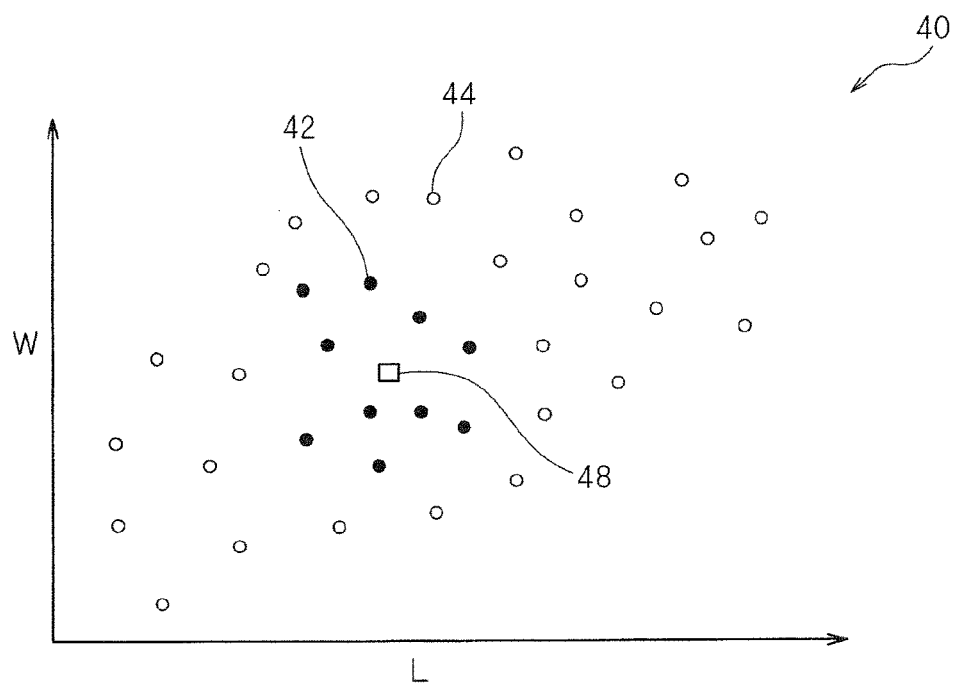
FIG. 3 is an explanatory view of a foot size distribution diagram. (Example 1)

FIG. 3 schematically shows a foot size distribution diagram 40 to be displayed on the terminal of the specified member. As shown in FIG. 3, in the foot size distribution diagram 40, the horizontal axis shows the foot length L, the vertical axis shows the foot circumference or foot width W, and marks 42 showing members who have histories of purchasing shoes selected from the shoe size distribution diagram 30, marks 44 showing members who have no history of purchasing the shoes, and a mark 48 showing a position corresponding to the foot size of the specified member, are displayed. Related information (presence or absence of the purchase history) on the selected shoes is indicated by the marks 42 and 44.

When only related information associated with members who have histories of purchasing the shoes are stored in the related information storage unit 29 and related information associated with members who have no history of purchasing the shoes are not stored in the related information storage unit 29, the marks 44 showing the members who have no history of purchasing the shoes are not displayed in the foot size distribution diagram 40.

In the foot size distribution diagram, further detailed related information may be displayed. For example, when the related information stored in the related information storage unit 29 includes shoe fitting comfort codes (classification codes for classifying the feeling of tightness that members who purchased shoes felt when they wear the shoes), the display mode of the marks in the foot size distribution diagram is changed according to the shoe fitting comfort codes.

For example, a member whose toes are strongly pressed inside the shoes is indicated by the mark "▲," and a member who has large room formed between the toes and the shoes is indicated by the mark "△."

In the foot size distribution diagram 40, a position corresponding to the foot size of the specified member is indicated by the mark 48, so that the fit of shoes selected from the shoe size distribution diagram 30 to the specified member can be examined with reference to related information displayed in the foot size distribution diagram 40 while considering the differences in foot size from the specified member.

(5) Display of Reference Information

Next, when the terminal is operated and a mark 42 is selected from the foot size distribution diagram 40, based on reference information data generated by the reference information generation unit 24, reference information is displayed on the terminal. As reference information, related information (for example, comments on the shoes) stored in the related information storage unit 29 in association with the shoe ID of the shoes selected from the shoe size distribution diagram 30 and the member ID of the member selected from the foot size distribution diagram 40 is displayed.

In the foot size distribution diagram 40, foot sizes are displayed in association with member IDs, so that when a mark 42 showing a foot size is selected from the foot size distribution diagram 40, a member ID corresponding to the mark 42 can be specified.

In the foot size distribution diagram 40, the position corresponding to the foot size of the specified member is indicated by the mark 48, so that by examining related information (reference information) associated with other members whose foot sizes are displayed in the foot size distribution diagram 40 while considering the differences in foot size from the specified member, the fit of the shoes selected from the shoe size distribution diagram 30 to the specified member can be examined.

As described above, with the shoe selection support system 10, related information of other members can be utilized while considering individual differences, and suitable size shoes can easily be selected.

Example 2

A shoe selection support system according to Example 2 is described with reference to FIG. 4 and FIG. 5. Example 2 is constituted in substantially the same manner as in Example 1. Hereinafter, differences from Example 1 are mainly described.

The shoe selection support system according to Example 2 includes a shoe information storage unit, a member information storage unit, and a related information storage unit which are constituted in the same manner as in the shoe selection support system according to Example 1, and a foot size distribution generation unit, a reference information generation unit, and a member specification unit constituted in substantially the same manner as in the shoe selection support system according to Example 1.

The foot size distribution generation unit reads member IDs and foot sizes of members from the member information storage unit, and generates foot size distribution data for displaying a foot size distribution diagram showing foot sizes of the members whose member IDs and foot sizes were read in association with the member IDs.

The reference information generation unit reads shoe IDs and related information stored in association with a member ID of a selected member selected from the foot size distribution diagram from the related information storage unit, and reads shoe information stored in association with the read shoe IDs from the shoe information storage unit. Then, the reference information generation unit generates reference information data for displaying the read related information and shoe information.

The member specification unit specifies the member ID, reads a foot size associated with the specified member ID from the member information storage unit, and generates data for displaying a position corresponding to the read foot size in the foot size distribution diagram.

Next, a flow of processing of the shoe selection support system is described.

(1) Member Specification

First, the member specification unit specifies a member ID and generates specific member data.

(2) Display of Foot Size Distribution Diagram

Next, a mode selection screen is displayed on the terminal. When the terminal is operated and the "foot see mode" is selected, based on the foot size distribution data generated by the foot size distribution generation unit, a foot size distribution diagram is displayed on the terminal.

Figure 4:
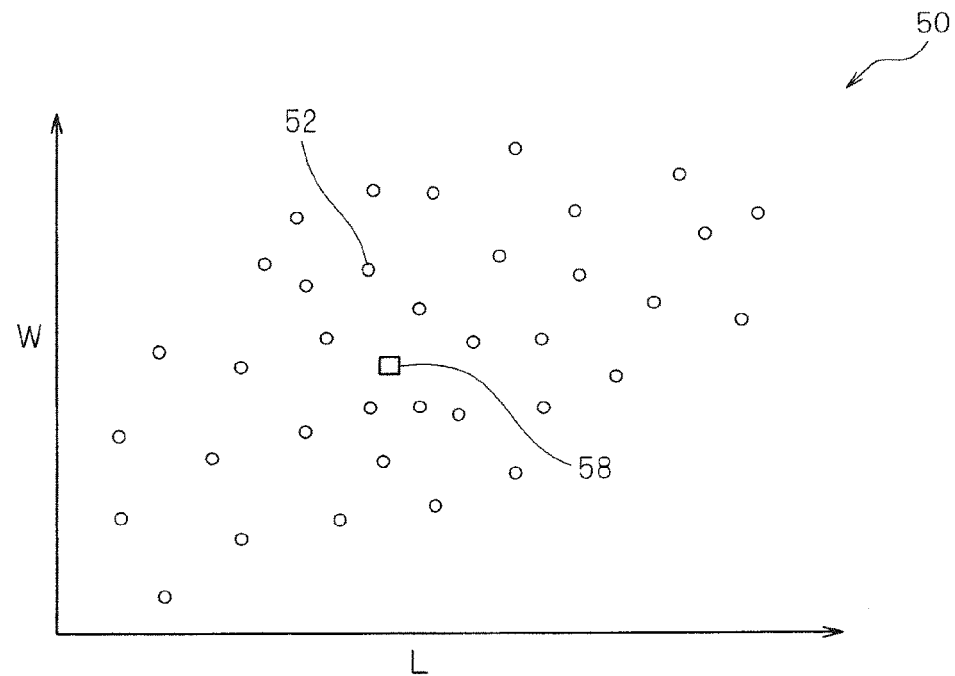
FIG. 4 is an explanatory view of a foot size distribution diagram. (Example 2)

FIG. 4 is an explanatory view schematically showing a foot size distribution diagram 50 that is displayed in the foot see mode. As shown in FIG. 4, in the foot size distribution diagram 50, the horizontal axis shows the foot length L, the vertical axis shows the foot circumference or foot width W, and marks 52 showing foot sizes of members and a mark 58 showing a foot size of a member (specified member) whose member ID was specified are displayed. It is possible that the members to be indicated by the marks 52 in the foot size distribution diagram 50 are narrowed down based on member information (for example, gender, exercise history, etc.).

(3) Display of Reference Information

Next, when the terminal is operated and a mark 52 is selected from the foot size distribution diagram 50, based on reference information data generated by the reference information generation unit, member information of a member corresponding to the mark 52 selected from the foot size distribution diagram 50 and reference information including shoe information and related information associated with the member are displayed on the terminal. In the foot size distribution diagram 50, a mark 58 showing the position corresponding to the foot size of the specified member is displayed, so that a mark 52 can be selected while considering the differences in foot size from the specified member.

Figure 5:
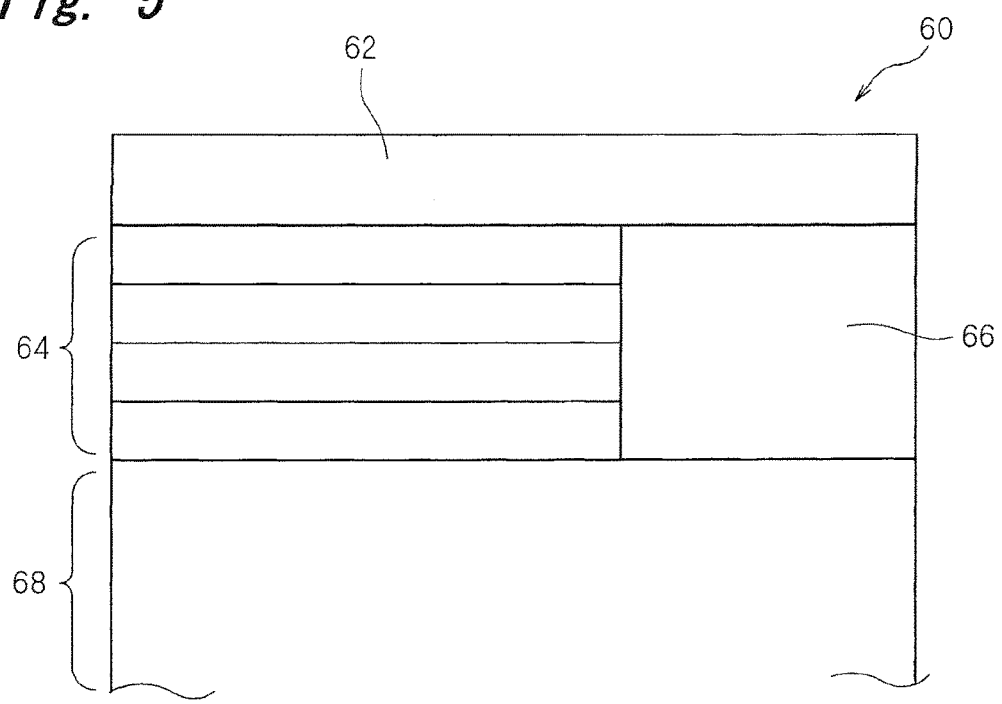
FIG. 5 is an explanatory view of a screen display of reference information. (Example 2)

FIG. 5 is an explanatory view schematically showing a screen display 60 of reference information displayed on the terminal of the specified member.

As shown in FIG. 5, in the first column 62, member information (for example, a foot size, an age, and an exercise history) of the member corresponding to the selected mark 52 is displayed.

In the second column 64, shoe information (for example, types of shoes and shoe sizes) of shoes purchased by the member corresponding to the selected mark 52 is displayed. It is possible that buttons and links are provided in the second column 64 to enable display of detailed information on the shoe store and moving to a website for performing procedures to purchase shoes.

In the third column 66, a photograph of shoes included in shoe information on the shoes selected in the second column 64 is displayed.

In the fourth column 68, related information (for example, fitting comfort and comments) on the relationship between the member displayed in the first column 62 and the shoes selected in the second column 64 is displayed.

As described above, in the foot size distribution diagram 50, a position corresponding to the foot size of the specified member is indicated by the mark 58, and the differences in foot size between the specified member and other members can be intuitively understood. Therefore, from the foot size distribution diagram 50, members whose differences in foot size from the specified member are small are easily narrowed down and reference information can be referred to.

When a member is selected from the foot size distribution diagram 50, member information of the selected member and shoe information and related information associated with the selected member are displayed. Therefore, while considering the differences in member information between the specified member and the selected member and referring to the related information on the shoes associated with the selected member, the fit of shoes associated with the selected member to the specified member can be examined.

As described above, with the shoe selection support system according to Example 2, related information of other members can be utilized while considering individual differences, and suitable size shoes can easily be selected.

Example 3

A shoe selection support system according to Example 3 is described with reference to FIG. 6.

The shoe selection support system includes a shoe information storage unit, a member information storage unit, a related information storage unit, and a shoe size distribution generation unit which are constituted in the same manner as in the shoe selection support system according to Example 1, and a reference information generation unit and a member specification unit constituted in substantially the same manner as in the shoe selection support system according to Example 1.

The reference information generation unit reads member IDs and related information stored in association with a shoe ID of shoes selected from the shoe size distribution diagram from the related information storage unit, and reads member information stored in association with the read member IDs from the member information storage unit. Then, the reference information generation unit generates reference information data for displaying the read related information and member information.

The member specification unit specifies a member ID, reads a foot size associated with the specified member ID from the member information storage unit, and generates data for displaying a position corresponding to the read foot size in the shoe size distribution diagram.

Next, a flow of processing of the shoe selection support system is described.

(1) Member Specification

First, the member specification unit 25 specifies a member ID, and generates specific member data.

(2) Display of Shoe Size Distribution Diagram

Next, a mode selection screen is displayed on the terminal. When the terminal is operated and the "shoes see mode" is selected, the same shoe size distribution diagram as that in Example 1 is displayed on the terminal.

In the shoe size distribution diagram, in the same manner as in Example 1, a position corresponding to the foot size of the specified member is displayed. From the shoe size distribution diagram, difference between the foot size and the shoe size that has a great influence on shoe fitting can be intuitively understood. Therefore, from the shoe size distribution diagram, shoes that are likely to fit the specified member can easily be selected.

(2) Selection of Shoes

When the terminal is operated and shoes are selected from the shoe size distribution diagram, based on reference information data generated by the reference information generation unit, reference information on the shoes selected from the shoe size distribution diagram is displayed on the terminal.

Figure 6:
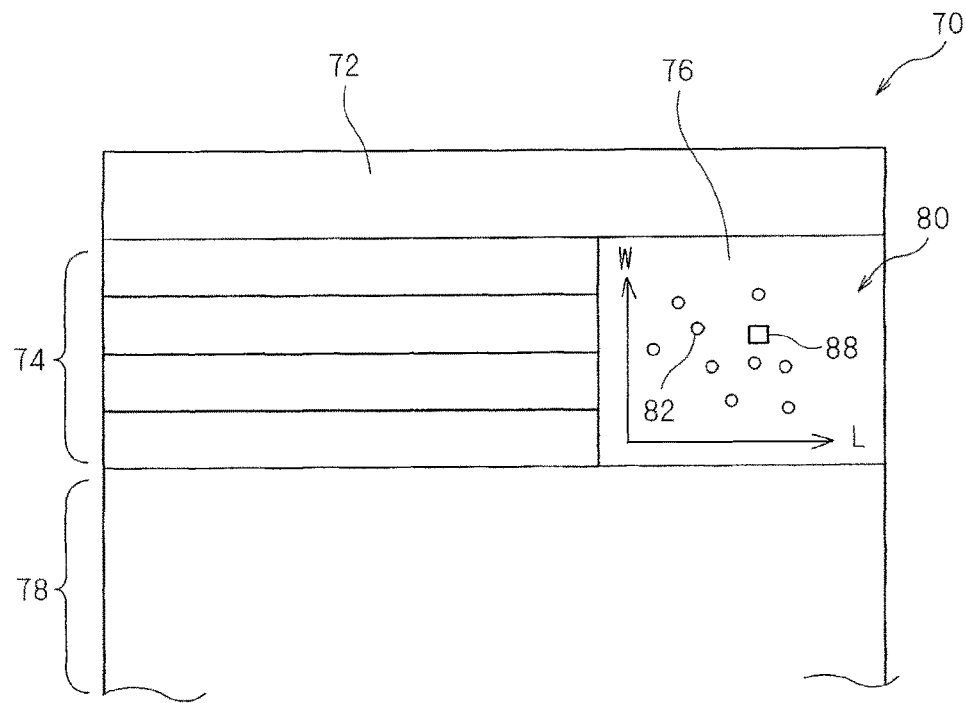
FIG. 6 is an explanatory view of a screen display of reference information. (Example 3)

FIG. 6 is an explanatory view schematically showing a screen display 70 of reference information to be displayed on the terminal.

As shown in FIG. 6, in the first column 72, shoe information on the selected shoes are displayed.

In the second column 74, member information (for example, foot sizes and gender, etc.) of members who have purchased the selected shoes are displayed.

In the third column 76, a foot size distribution diagram 80 is displayed. In this foot size distribution diagram 80, marks 82 showing the members displayed in the second column 74 and a position corresponding to the foot size of the specified member are displayed.

In the fourth column 78, related information (fitting comfort and comments, etc.) on the relationship between a member selected in the second column 74 or third column 76 and the shoes displayed in the first column 72 is displayed.

As reference information, related information on the shoes selected from the shoe size distribution diagram and member information of the members whose member IDs are associated with the related information are displayed, so that by referring to the related information (for example, fitting comfort) on the shoes selected from the shoe size distribution diagram while considering the differences in member information (for example, gender and exercise history) between the specified member and the members associated with the related information, the fit of the shoes selected from the shoe size distribution diagram to the specified member can be examined.

As described above, with the shoe selection support system according to Example 3, related information of other members can be utilized while considering individual differences, and suitable size shoes can easily be selected.

Example 4

A membership acceptance unit that the shoe selection support systems according to Examples 1 to 3 further include is described.

A membership acceptance unit generates a member ID and member information of a new member which are stored in association with each other in the member information storage unit. The membership acceptance unit is constituted separately from the system server of the shoe selection support system and connected directly or via a communication network, etc., to the system server of the shoe selection support system. The membership acceptance unit may be constituted within the system server of the shoe selection support system. Hereinafter, the case where the membership acceptance unit is constituted separately from the system server of the shoe selection support system is described.

The membership acceptance unit is connected to a terminal of an applicant who wants to carry out a new member registration in the shoe selection support system via a communication network such as a cell phone or the Internet, etc., and these communicate with each other. A part of the functions of the membership acceptance unit may be installed as application software in a handheld terminal such as a smartphone or a personal computer, etc., of the new member.

The membership acceptance unit generates a foot size of the applicant based on information received from the terminal of the applicant, acquires other information, and determines a member ID.

The membership acceptance unit receives data of a photograph of feet transmitted from the terminal of the applicant, and calculates a foot size based on the received photograph.

Figure 7:
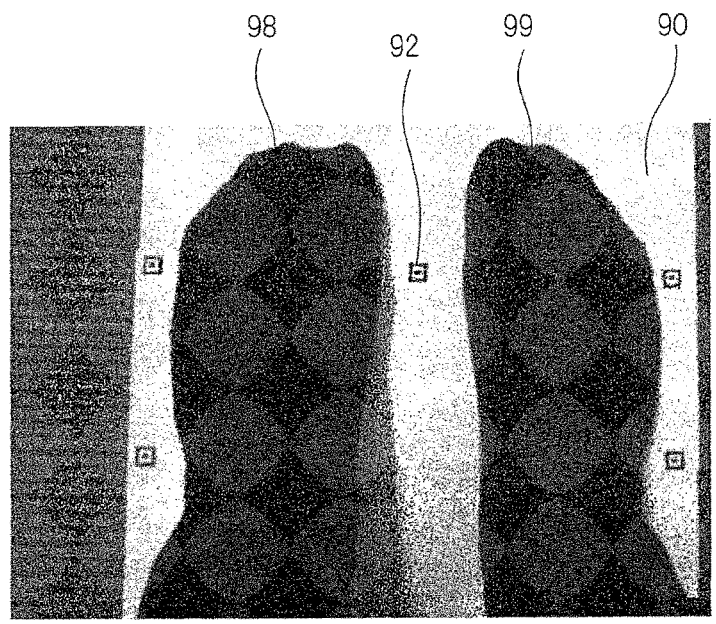
FIG. 7 is a photograph of feet. (Example 4)

For example, as shown in the photograph of feet shown in FIG. 7, the new member photographs his/her own feet 98 and 99 with a built-in camera of the terminal (a cell phone or handheld terminal) or a digital camera in a state where the new member stands on a predetermined position on a measurement sheet 90, and transmits the data of the taken photograph from the terminal to the membership acceptance unit. On the measurement sheet 90, reference marks 92 for specifying coordinates are printed. Data of a photograph taken so as to include the reference marks 92 and the toe sides of the feet 98 and 99 in a state where the measurement sheet 90 is laid on the floor and the feet 98 and 99 are placed at predetermined positions on the measurement sheet 90 (for example, a state where the heel centers of the feet and the second toe tip centers of the feet are placed on predetermined lines on the measurement sheet, and the rear ends of the heels of the feet are placed at predetermined positions on the measurement sheet 90) is transmitted to the membership acceptance unit.

The membership acceptance unit extracts predetermined portions of the feet and the reference marks based on the received data of the photograph, and determines the coordinate values of the predetermined portions of the feet based on the reference marks, thereby calculates the foot size. For example, after correcting for distortion in the photograph based on the reference marks, the membership acceptance unit determines coordinate values of the second toe tip centers, and calculates the values of the foot lengths from the heels to the second toe tips.

On transmission of the photographic data of the feet from the applicant, or before or after the transmission, the membership acceptance unit receives information on the applicant (for example, an e-mail address, name, and gender, etc.) input from the terminal of the applicant, determines a member ID of the applicant, and notifies the terminal of the applicant of the member ID.

The membership acceptance unit transmits the member ID of the applicant and member information of the applicant including the foot size calculated from the photograph of the feet to the system server of the shoe selection support system. The system server of the shoe selection support system makes the member information storage unit store the received member ID and member information in association with each other.

As additional service, the membership acceptance unit may transmit results of diagnosis of the health status of the feet (for example, colors of the toes and the degree of bunions, etc.) based on the photographic data of the feet to the terminal of the applicant.

From the photograph of the feet, the foot size can be calculated with a certain degree of accuracy, so that this provides incentive for carrying out a new member registration in the shoe selection support system. By using a foot shape measuring device (for example, a three-dimensional shape measuring device) of the shoe selection support system, the foot size can be measured more accurately than in the case using a photograph, so that a new member whose foot size was calculated from the photograph of the feet can be encouraged to use the foot shape measuring device of the shoe selection support system.

For example, in the block diagram shown in FIG. 1, three-dimensional data of a foot size obtained through measurement with the foot shape measuring device is transmitted from the terminal 16 incorporated in or connected to the foot shape measuring device to the system server 20 via the communication network 12. When measurement is performed with a foot shape measuring device installed in a shoe store, three-dimensional data of a foot size is transmitted from the terminal 15 of the shoe store to the system server 20 via the communication network 12.

Conclusion

With the shoe selection support system according to the present invention, information from other people can be utilized while considering individual differences, and suitable size shoes can easily be selected. As a result, targets to be tried on can be properly narrowed down and the number of times of trial fitting can be reduced. In addition, the possibility of selecting a suitable size is increased, so that with shopping for shoes by mail order, returns and exchanges can be reduced.

The present invention should not be limited to the embodiments described above, but can be carried out with various modifications.

For example, the membership specification unit may generate member specification data when it is necessary to display a shoe size distribution diagram and a foot size distribution diagram.

DESCRIPTION OF THE REFERENCE SYMBOLS

10 shoe selection support system
12 communication network
14 to 17 terminal
20 system server
22 shoe size distribution generation unit
23 foot size distribution generation unit
24 reference information generation unit
25 member specification unit
27 shoe information storage unit
28 member information storage unit
29 related information storage unit
30 shoe size distribution diagram
40, 50 foot size distribution diagram
60, 70 screen display
80 foot size distribution diagram
90 measurement sheet
92 reference mark
98, 99 foot

What is claimed is:

1. A shoe selection support system comprising:
a system server that communicates a terminal including a foot shape measuring device; and
a storage device that is connected to the system server, comprising
a shoe information database that stores shoe IDs for specifying shoes and shoe information including shoe sizes of the shoes in association with each other;
a member information database that stores member IDs for specifying members and member information including foot sizes of the members in association with each other; and
a related information database that stores related information on the relationship between the shoes and the members, the shoe IDs of the shoes, and the member IDs of the members in association with each other,
wherein the system server reads the shoe IDs and the shoe sizes of the shoes from the shoe information database and generates shoe size distribution data for displaying a shoe size distribution diagram showing the shoe sizes and the shoe IDs of the shoes in association with each other,
the system server
receives the shoe ID of the shoes selected from the shoe size distribution diagram from the terminal,
reads the member IDs and the related information stored in association with the shoe ID of the shoes received, from the related information database, reads the foot sizes stored in association with the read member IDs from the member information database, and generates foot size distribution data for displaying a foot size distribution diagram showing the read foot sizes of the members having the read member IDs together with the read related information, and the system server receives a specified member ID from the terminal, reads the foot size associated with the specified member ID from the member information database, generates a first specific member data for displaying a first mark at a position corresponding to the read foot size associated with the specific member ID in the shoe size distribution diagram in order that the first mark may differ from the other marks in the shoe size distribution, generates a second specific member data for displaying a second mark at a position corresponding to the read foot size associated with the specified member ID in the foot size distribution diagram in order that the second mark differs from the other marks in the foot size distribution diagram, sends the shoe size distribution data and the first specific member data to the terminal, sends the foot size distribution data and the second specific member data to the terminal, and calculates the foot size based on data of feet received from the foot shape measuring device.

2. The shoe selection support system according to claim 1, wherein the system server generates a first reference information data for displaying the related information stored in the related information database in association with the shoe ID of the shoes selected from the shoe size distribution diagram, and sends the first reference information data to the terminal, and the system server generates a second reference information data for displaying the related information stored in the related information database in association with the member ID of the member selected from the foot size distribution diagram, and sends the second reference information data to the terminal.

3. The shoe selection support system according to claim 1, wherein the system server generates the member ID and the member information which are stored in the member information database in association with each other, and the system server calculates the foot size based on photographic data of feet.

4. The shoe selection support system according to claim 1, wherein the system server includes an interface for communication with a member, a shoe store, the foot shape measuring device, and a shoe factory, a CPU, and execute predetermined programs.

5. The shoe selection support system according to claim 1, wherein the foot shape measuring device includes a three-dimensional shape measuring device, and the system server calculates the foot size based on three-dimensional data of feet received from the three-dimensional shape measuring device.

6. A shoe selection support system comprising:

a system server that communicates a terminal including a foot shape measuring device; and a storage device that is connected to the system server, comprising a shoe information database that stores shoe IDs for specifying shoes and shoe information including shoe sizes of the shoes in association with each other;

a member information database that stores member IDs for specifying members and member information including foot sizes of the members in association with each other; and a related information database that stores related information on the relationship between the shoes and the members, the shoe IDs of the shoes, and the member IDs of the members in association with each other, wherein the system server reads the member IDs and the foot sizes of the members from the member information database, and generates foot size distribution data for displaying a foot size distribution diagram showing the read foot sizes of the members in association with the member IDs, the system server receives the member ID corresponding to the foot size selected from the foot size distribution diagram from the terminal, reads the shoe IDs and the related information stored in association with the member ID received, from the related information database, reads the shoe information stored in association with the read shoe IDs from the shoe information database, generates a first reference information data for displaying the read related information and the read shoe information, and sends the first reference information data to the terminal, and the system server receives a specified member ID from the terminal, reads the foot size associated with the specified member ID from the member information database, generates a first specific member data for displaying a first mark at a position corresponding to the read foot size associated with the specified member ID in the foot size distribution diagram in order that the first mark may differ from the other marks in the foot size distribution diagram, sends the shoe size distribution data and the first specific member data to the terminal, and calculates the foot size based on data of feet received from the foot shape measuring device.

7. The shoe selection support system according to claim 6, wherein the system server generates the member ID and the member information which are stored in association with each other in the member information database, and the system server calculates the foot size based on photographic data of feet.

8. A shoe selection support system comprising:

a system server that communicates a terminal including a foot shape measuring device; and a storage device that is connected to the system server, comprising a shoe information database that stores shoe IDs for specifying shoes and shoe information including shoe sizes of the shoes in association with each other;

a member information database that stores member IDs for specifying members and member information including foot sizes of the members in association with each other; and a related information database that stores related information on the relationship between the shoes and the members, the shoe IDs of the shoes, and the member IDs of the members in association with each other, wherein the system server reads the shoe IDs and the shoe sizes of the shoes from the shoe information database and generates shoe size distribution data for displaying a shoe size distribution diagram showing the shoe sizes and the shoe IDs of the shoes in association with each other, the system server receives the shoe ID of the shoes selected from the shoe size distribution from the terminal, reads the member IDs and the related information stored in association with the shoe ID of the shoes received, from the related information database, reads the member information stored in association with the read member IDs from the member information database, generates a first reference information data for displaying the read related information and the read member information, and sends the first reference information data to the terminal, and the system server receives a specified member ID from the terminal, reads the foot size associated with the specified member ID from the member information database, generates a first specific member data for displaying a first mark at a position corresponding to the read foot size associated with the specified member ID in the shoe size distribution diagram in order that the first mark differs from the other marks in the shoe size distribution diagram, sends the shoe size distribution data and the first specific member data to the terminal, and calculates the foot size based on data of feet received from the foot shape measuring device.

9. The shoe selection support system according to claim 8, wherein the system server generates the member ID and the member information which are stored in association with each other in the member information database, and the system server calculates the foot size based on photographic data of feet.

* * * * *